May 7, 1957 F. G. BLAKE ET AL 2,791,757
PRESSURE CABLE CONSTRUCTION
Filed March 24, 1954 2 Sheets-Sheet 1
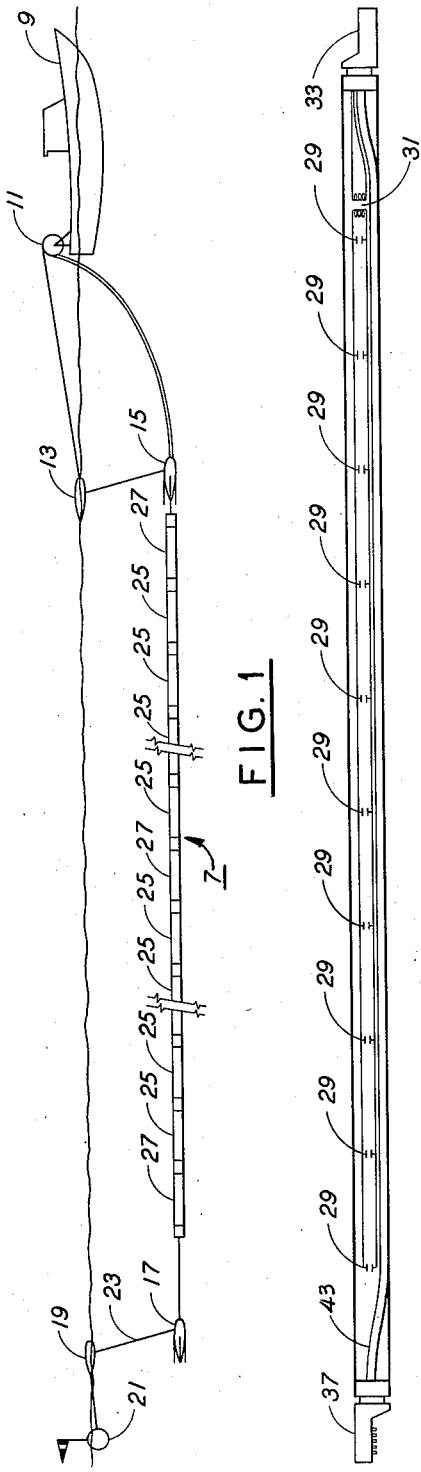
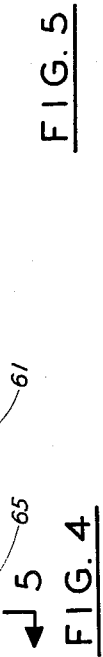
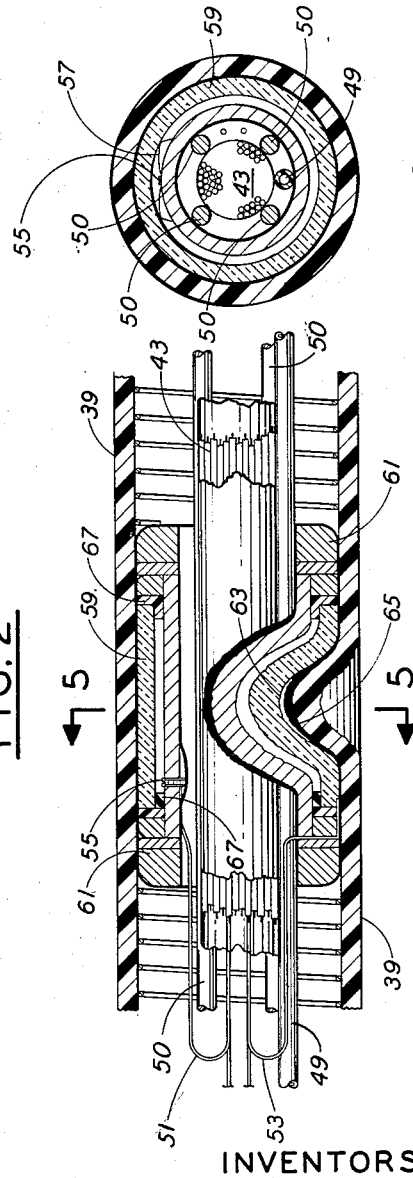
INVENTORS
GLENN A. SCHURMAN
FRANCIS G. BLAKE
PAUL M. AAGAARD
BY
ATTORNEYS

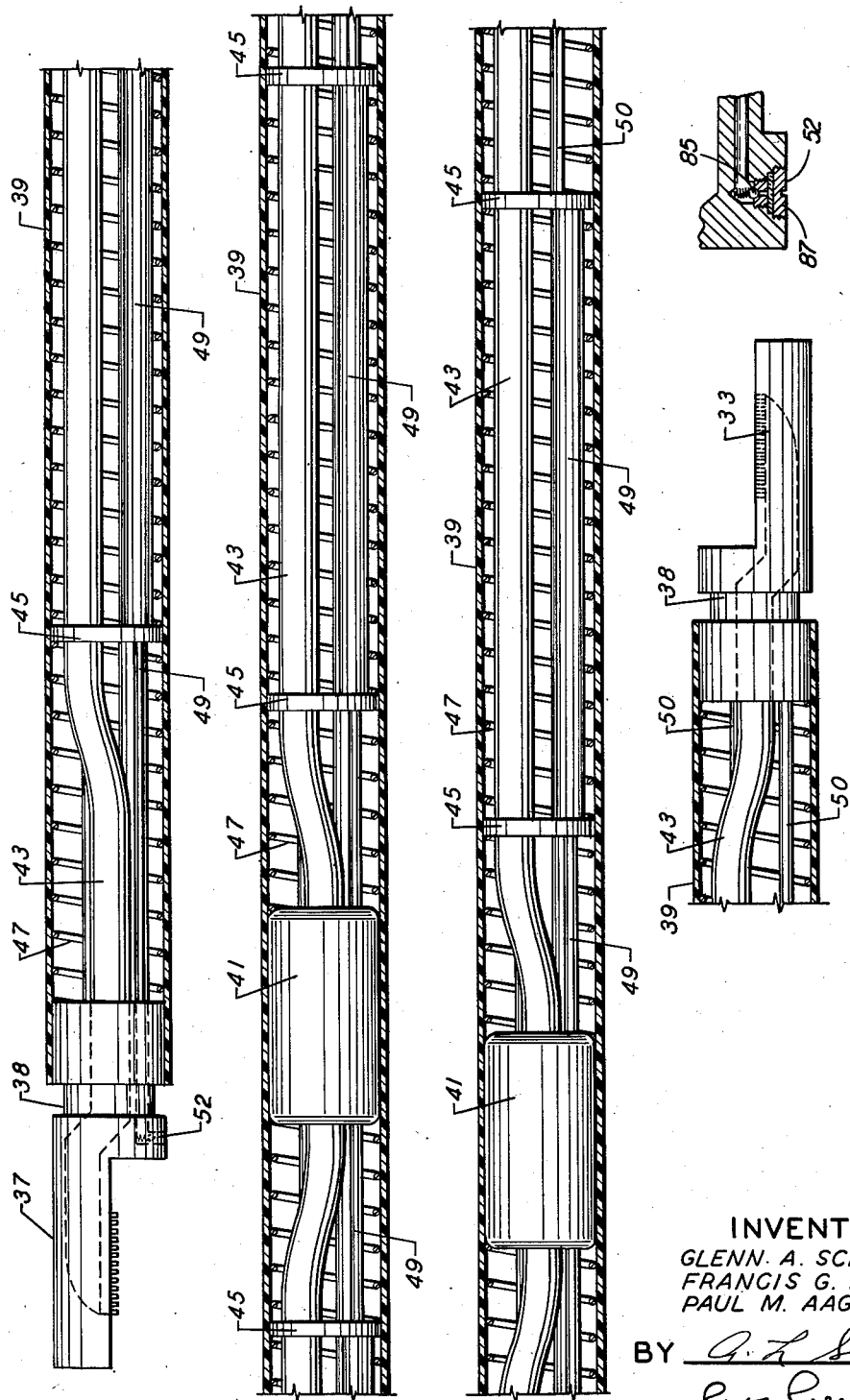

United States Patent Office 2,791,757
Patented May 7, 1957

2,791,757
PRESSURE CABLE CONSTRUCTION

Francis G. Blake, Fullerton, Glenn A. Schurman, Whittier, and Paul M. Aagaard, Rivera, Calif., assignors to California Research Corporation, San Francisco, Calif., a corporation of Delaware Application March 24, 1954, Serial No. 418,392

4 Claims. (Cl. 340—7)

Our invention relates to a detector cable and particularly to a cable for use in seismic prospecting.

Seismic prospecting has been performed in water-covered areas by the use of a neutral buoyancy pressure detector cable. A number of problems arise in the construction of a suitable seismic detector cable. First, the density of the cable must be proper to provide neutral buoyancy; however, a cable which has neutral buoyancy in one body of water may sink in another body of water, since the salinity of water in various places on the earth's surface varies sufficiently to change the density of the water by as much as 4 percent. Accordingly, we have found that the density of the cable must be made variable.

It is desirable that the detector cable be usable while it is being towed through the water. Accordingly, we have found that it is desirable that the detector cable be smooth and have a uniform cross-section so that it will not cause turbulence as it moves through the water. Such a cable must have sufficient sensitivity to detect all seismic reflections. We have achieved the desired degree of sensitivity by the use of a group of pressure detectors which are in close contact with the water.

A seismic cable which is to be towed through the water is subject to striking rough objects in the water. We have devised a strengthened covering for the detector cable, have provided for additional longitudinal strength, and have arranged the cable so that small sections of it may be replaced in the event of damage to it.

In some areas, the most effective use of the seismic prospecting method may be made if a maximum number of seismic traces are recorded. Accordingly, we have provided a cable in which the signals from the detectors are not electrically mixed in the cable.

It is an object of our invention to provide a pressure detector cable, the density of which may be easily varied in a predetermined manner.

It is a further object of our invention to provide a detector cable having a constant volume, relatively independent of the hydrostatic pressure to which it is subjected.

It is a further object of our invention to provide a pressure detector which is in intimate contact with the fluid, the pressure variations in which are to be determined.

It is yet another object of our invention to provide a pressure detector cable in which a helical strengthening member maintains constant the volume of the pressure detector cable.

It is a further object of our invention to provide a passage within a pressure detector cable into which may be introduced varying amounts of fluid in order to adjust the density of the detector cable.

Another object of our invention is to provide a cylindrical pressure detector crystal which is in contact with a pressure transmitting protective envelope.

According to our invention, the density of the pressure detector cable is adjusted by the introduction of a fluid into a resilient tube in the cable, one end of which is accessible at the surface of the cable. A helical, cylindrical member maintains constant the cross-sectional area of the cable, and the detector comprises a cylindrical crystal in contact with the protective sleeve which covers the cable.

The novel features of our invention are set forth with more particularity in the accompanying claims. The invention itself, however, with respect to the details thereof, together with its additional advantages, may be better understood from the following description of specific embodiments with reference to the accompanying drawing, in which:

Fig. 1 shows a seismic cable in position to be used;
Fig. 2 shows schematically the arrangement of the parts of a seismic cable;
Fig. 3 shows the internal arrangement of a seismic cable;
Fig. 4 shows a cross-section of the pressure detector element;
Fig. 5 shows a second cross-section of the pressure detector element;
Fig. 6 is a partial view of connector 37 illustrating the details of the liquid control valve.

As shown in Fig. 1, a seismic cable 7 is towed behind a boat 9. A reel 11 on the boat 9 is attached to a buoy 13 and a paravane 15. The paravane is attached to the cable 7 and arranged to maintain a constant depth below the surfce of the water. A second paravane 17 at the other end of the cable 7 maintains the rear end of the cable at a constant level below the surface. Rear buoy 19 and marker buoy 21 are attached to the rear paravane 17 by a cable 23 which has a length determined by the depth at which the cable 7 is to be towed. The cable itself consists of a number of active detector sections 25 and a number of inactive sections 27. The active sections 25 contain pressure detectors which are adapted to detect pressure variations in the water. The inactive sections 27 contain conductors which transmit signals from the detector sections.

The paravane 17 is heavy and serves as an inertia member, while the combination of rear buoy 19 and paravane 17 is slightly buoyant. The marker buoy 21 is highly buoyant. The rear buoy 19 rides at the surface of the sea as the cable is towed through the water. The inertia of the cable and paravane 17 is such that the rear buoy 19 does not ride the tops of the waves, but skims through the surface of the water on a horizontal line. In the event that the cable is completely ruptured, the buoyancy of the rear buoy 19 is insufficient to support the cable in the water. The marker buoy 21 remains on the surface and is capable of supporting the weight of the cable, even when one section of the cable is filled with water. The marker buoy then facilitates the recovery of the cable after it has been damaged.

In operation, the cable is reeled out on the reel 11 when the boat 9 is in the vicinity which is to be explored. The paravanes 15 and 17 are located at the desired depth below the surface of the water. The boat 9 moves over the prospect at a slow rate of speed, and a charge of explosive is detonated near the center of the cable 7. The inactive section 27 at the center of the cable serves to separate active sections 25 from the immediate vicinity of the shot in order to avoid having the explosive damage the pressure detectors. The inactive sections 27 at the ends of the cable serve as terminations for the cable. Signals from the pressure detector are transmitted through a cable to the boat 9, where they are recorded. The pressure signals from each active section 25 of the cable 7 may be recorded separately, or signals from the various sections 25 may be mixed and recorded.

Fig. 2 shows in more detail the electrical arrangement of the cable. Since in our preferred embodiment of our invention we employ a piezoelectric crystal, the detectors are shown as capacitors 29. A number of detectors are connected in parallel in order to achieve the desired sensitivity to pressure variations. An impedance matching transformer 31 is connected to the detectors. Two wires from the transformer 31 lead to the female connector 33. A bundle of wires 43 conducts signals from the male connector 37 to the female connector 33 of the detector cable. By means of the connectors 33 and 37, series of pressure detector cables may be connected together. The inactive sections 27 do not contain detectors.

Fig. 3 shows in more detail the arrangement of our pressure detector cable. The male connector 37 is affixed to a cylindrical tube 39. This tube must be strong enough to resist abrasion by coral and other objects which are found in the sea. It must also have acoustic properties such that it causes a minimum of attenuation of acoustic waves between the sea and the interior of the cable. Located at several points within the cable are pressure detectors 41. A bundle of wires 43 passes through the cable from the male connector 37 to the female connector 33. A pair of wires from the bundle of wires 43 are tapped at each pressure detector 41 to provide a signal which passes to the connector 33. At intervals within the cable are spacer members 45 which are sized to fit snugly within the tube 39. Between the spacer members 45 are metal helical members 47 which are also sized to fit snugly within the tube 39.

The pressure detector cable contains a number of metal elements, such as the bundle of wires 43, and other elements, such as the detectors 41, the size of which are determined by the electrical requirements of the circuit. It is desired that the cable have neutral buoyancy in sea water. Accordingly, the interior of the cable must have a minimum of heavy material, other than that essential to the electrical operation of the detector. Thus, it is not desirable to fill the interior of the cable with a fluid or with dense strengthening members, since they would be likely to increase the density of the cable to a value greater than that of sea water. Accordingly, we use the helical member 47 which may take the form of a steel spring. The helical member 47 is intended to withstand radial forces on the cable and is insulated from axial forces along the cable by the spacer members 45. Further, we have found that it is important to the efficient use of such a cable that it be sufficiently flexible to be reeled on the drum 11 shown in Fig. 1. The helical member 47 has great flexibility as regards bending of the cable, but has rigidity as regards radial pressure on the cable. Thus, it maintains a constant cross-section on the cable despite variations in pressure on the cable which may arise from the cable's use at varying depths below the surface of the sea. The helical member 47 also provides radial rigidity which prevents the cable's acting as a pressure relief surface adjacent to the crystals and thus prevents a corresponding reduction in sensitivity. Our cable is intended to be usable for detecting seismic signals while it is in motion through the water behind a towing boat. A pressure detector, such as the crystal 41, cannot discriminate between pressure variations due to water turbulence and pressure variations due to the arrival of seismic signals. In seismic prospecting, the seismic signal provides valuable information, while water turbulence is characterized as noise. Accordingly, our cable is smooth and has the same cross-section throughout its entire length. The connectors 33 and 37 are of the same cross-section as the tube 39. The helical members 47 and the spacer members 45 maintain constant the cross-section of the cable throughout its length. Thus, the cable causes a minimum of water turbulence as it is towed behind the boat.

The interior of the cable where it is not occupied by elements essential to the pressure-detecting and volume-controlling elements, is filled with air or another light fluid. A resilient tube 49 passes from a valve 52 in the connector 37 through the tube to a termination at the spacer member 45. The spring-actuated ball 85 of valve 52 permits introduction of liquid into tube 43 at a predetermined pressure. The cover 87 aids valve 52 to retain liquid in tube 43. Withdrawal of liquid from tube 43 is made by removing cover 87 and depressing ball check 85 so that fluid will run out. Oil may be introduced through the valve 52 to fill the tube 49 and thereby increase the weight of the seismic cable. The amount of oil within the tube 49 may be varied from an amount which stretches the tube 49 to an amount which leaves the tube 49 partly collapsed. Valve 52 is readily accessible without entering the seismic cable, and oil may be introduced to the tube 49 when the cable is moved to a new body of water, when the cable is used near the mouth of a river emptying into a body of salt water, or when the density of the sea water changes sufficiently to require a change in the density of the seismic cable. The tube 49 may also be used as a means of permanently adjusting the density of the seismic cable, since it may be filled with a fluid either denser or less dense than the fluid within the remainder of the cable. Thus, the density of the cable may either be increased or decreased on a permanent basis by the use of the tube 49. Further details of cable connector 37 and valve 52 are disclosed in the copending application Serial No. 418,391, filed March 24, 1954, in the names of said Glenn A. Schurman and Paul M. Aagaard.

The notches 38 on the connectors 33 and 37 are filled by a face plate which covers the connectors when two sections of seismic cable are joined. Thus, the connector itself affords no irregularities which can cause turbulence in the water.

The details of the crystal assembly are shown in Fig. 4. Through the center of the crystal runs the bundle of conductors 43. In the preferred embodiment of our invention, we prefer to use seventy-two conductors which are to be connected to thirty-six groups of crystals. In one cable section, a pair of wires 51 and 53 are separated from the bundle and connect to the crystals in parallel. The conductor 51 is connected to a contact 55, the head of which is shown in Fig. 5. The contact 55 secures a resilient member 57 which is in pressure contact with the inner face of a piezoelectric crystal 59. Both the inner and outer faces of the crystal 59 are coated with a conductive silver compound. The resilient member 57 thus forms a connection between the conductor 51 and the inner surface of the crystal 59. The conductor 53 is connected to the outer surface of the crystal 59. The crystal 59 is a hollow cylinder, preferably of barium titanate. The crystal is supported at its ends by the end members 61, and the entire crystal assembly is coated with rubber or an artificial rubber such as neoprene, and the neoprene coating of the crystal assembly is in intimate contact with the tube 39. Thus, the crystal has first a coating 63 of a silver compound, then a coating 65 of neoprene, then a protective cover 39 of reinforced neoprene tubing. The inner surface of the crystal 59 is unsupported, except at the edges by the positioning members 67. In the center of the crystal assembly is the bundle of conductors 43 and four strength members 50. The resilient tube 49 also passes through the center of the crystal. The tube 49 has a larger diameter in the portion of the tube 39 between the crystals than it has as it passes through the crystals. The tube 49 is used primarily to increase the density of the cable section and is not needed as much to perform this function in the vicinity of the crystal, since the crystal, itself, increases the density of the cable section. It is to be noted that the conductors 51 and 53 merely branch to form a connection with the crystal 59. These same conductors connect with nine other crystals in the same cable section, thus connecting the crystals in parallel. The use of several crystals increases the power sensitivity of a detector by adding the signals from the various crystals and extends the line over which the seismic signals are mixed within the cable. Extending the crystals over a fifty-foot interval tends to cancel noise induced by turbulence and action of the water waves. Cancellation of noise due to shallow inhomogeneities may be achieved by mixing the signals from more than one fifty-foot section as the signals are recorded at the boat.

Preferably, the tube or casing of our seismic cable is of a polychloroprene rubber such as neoprene impregnated with a fabric of a synthetic fiber-forming polymeric amide having a protein-like chemical structure such as nylon. Such constituents are believed to provide great strength and toughness, but our invention is not to be limited to such construction.

While we have described our invention with reference to a single embodiment, we are aware that many modifications thereof may be made without departing from the scope of our invention. We do not intend, therefore, to limit our invention except as set forth in the appended claims.

We claim:

1. For detecting underwater sound by the use of a flexible casing, a plurality of pressure detectors within said casing, conductors connected to respective detectors and positioned longitudinally of said casing for conducting signals from said detectors outwardly of said casing to a recorder, the combination comprising a flexible helical strengthening member placed adjacent to and in supporting contact with said flexible casing to provide an elongated chamber within said casing, an elongated resilient tube within said chamber, and means for introducing a liquid within said tube at a predetermined pressure.

2. Apparatus for detecting underwater sound by the use of a flexible casing, a plurality of pressure detectors within said casing, conductors connected to respective detectors and positioned longitudinally of said casing for conducting signals from said detectors outwardly of said casing to a recorder, the combination comprising an electrical connector at each end of said casing, connections between one of said connectors and said conductors, a plurality of wires connected through said casing from one said connector to the other, a waterproof coating around said wires, a flexible helical strengthening member placed adjacent to and in supporting contact with said flexible casing to provide an elongated chamber within said casing.

3. For use indetecting seismic signals in water, the combination comprising a streamer adapted to be towed behind a boat, a sleeve for said streamer of a resilient, fabric-reinforced material, a plurality of pressure detectors spaced apart within said streamer, a resilient helical member within said sleeve and adapted to support the sleeve in such a manner as to maintain a constant cross-section on said sleeve.

4. Apparatus for detecting underwater sound by the use of a flexible casing, a plurality of pressure detectors within said casing, conductors connected to respective detectors and positioned longitudinally of said casing for conducting signals from said detectors outwardly of said casing to a recorder, the combination comprising a gas within said casing, said gas having a density much less than that of water, an elongated resilient tube within said casing and a valve adapted to permit introduction of a liquid into said tube at a predetermined pressure, and means for retaining said liquid in said tube and permitting controlled removal of said liquid from said tube.

References Cited in the file of this patent

UNITED STATES PATENTS

| | | |
|---|---|---|
| 1,470,733 | Hayes | Oct. 16, 1923 |
| 2,440,903 | Massa | May 4, 1948 |
| 2,465,696 | Paslay | Mar. 29, 1949 |
| 2,558,763 | Lee | July 3, 1951 |
| 2,649,778 | Buffet | Aug. 25, 1953 |